US012643291B2

(12) United States Patent
Rumbak et al.

(10) Patent No.: US 12,643,291 B2
(45) Date of Patent: Jun. 2, 2026

(54) SYSTEM AND METHOD FOR HIGH THROUGHPUT THREE-DIMENSIONAL PRINTING

(71) Applicant: Stratasys Ltd., Rehovot (IL)

(72) Inventors: Mayan Rumbak, Mazkeret Batia (IL); Shai Sultan, Moshav Ganei Tal (IL)

(73) Assignee: Stratasys Ltd., Rehovot (IL)

( * ) Notice: Subject to any disclaimer, the term of this patent is extended or adjusted under 35 U.S.C. 154(b) by 139 days.

(21) Appl. No.: 18/284,589

(22) PCT Filed: Mar. 28, 2022

(86) PCT No.: PCT/IL2022/050336
§ 371 (c)(1),
(2) Date: Sep. 28, 2023

(87) PCT Pub. No.: WO2022/208495
PCT Pub. Date: Oct. 6, 2022

(65) Prior Publication Data
US 2024/0173919 A1 May 30, 2024

Related U.S. Application Data

(60) Provisional application No. 63/167,685, filed on Mar. 30, 2021.

(51) Int. Cl.
*B29C 64/112* (2017.01)
*B29C 64/209* (2017.01)
(Continued)

(52) U.S. Cl.
CPC .......... *B29C 64/336* (2017.08); *B29C 64/112* (2017.08); *B29C 64/209* (2017.08);
(Continued)

(58) Field of Classification Search
None
See application file for complete search history.

(56) References Cited

U.S. PATENT DOCUMENTS

| | | | |
|---|---|---|---|
| 9,718,238 B2 | 8/2017 | Teken | |
| 2010/0191360 A1 | 7/2010 | Napadensky | |
| 2018/0361655 A1 | 12/2018 | Chen et al. | |

FOREIGN PATENT DOCUMENTS

| | | | |
|---|---|---|---|
| JP | 2003 145 630 A | * | 5/2003 |
| JP | 2015-217670 | | 12/2015 |

(Continued)

OTHER PUBLICATIONS

International Preliminary Report on Patentability Dated Oct. 12, 2023 From the International Bureau of WIPO Re. Application No. PCT/IL2022/050336 (8 Pages).

(Continued)

*Primary Examiner* — Mohammad M Ameen

(57) ABSTRACT

A method for 3D color printing of an object includes slicing a 3D model of the object, adding color data to slices of the 3D model and printing the slices with a printing block including a plurality of channels. The plurality of channels include channels, each with different colored building material, and a channel with a clear building material. Printing includes dispensing at each target location of a travel of the printing block, building material from two channels of the plurality of channels. The two channels per target location are selected based on the color data.

20 Claims, 13 Drawing Sheets

(51) Int. Cl.

| | | |
|---|---|---|
| *B29C 64/336* | (2017.01) | |
| *B29C 64/386* | (2017.01) | |
| *B33Y 10/00* | (2015.01) | |
| *B33Y 30/00* | (2015.01) | |
| *B33Y 50/00* | (2015.01) | |
| *B33Y 70/00* | (2020.01) | |

(52) U.S. Cl.
CPC ............ *B29C 64/386* (2017.08); *B33Y 10/00* (2014.12); *B33Y 30/00* (2014.12); *B33Y 50/00* (2014.12); *B33Y 70/00* (2014.12); *B29K 2995/0021* (2013.01)

(56) References Cited

FOREIGN PATENT DOCUMENTS

| JP | 2016-26915 | 2/2016 |
|---|---|---|
| JP | 2018-052078 | 4/2018 |
| JP | 2020 147 046 A * | 9/2020 |
| JP | 2020-147046 | 9/2020 |
| WO | WO 2016/199611 | 12/2016 |
| WO | WO 2022/208495 | 10/2022 |

OTHER PUBLICATIONS

International Search Report and the Written Opinion Dated Jun. 13, 2022 From the International Searching Authority Re. Application No. PCT/IL2022/050336. (52 Pages).

Communication Pursuant to Article 94(3) EPC Dated Sep. 26, 2025 From the European Patent Office Re. Application No. 22715777.3 (5 Pages).

Notice of Reasons for Rejection Dated Dec. 16, 2025 From the Japan Patent Office Re Application No. 2023-560931 and its Machine Translation into English. (8 Pages).

Office Action Dated Feb. 5, 2026 From the Israel Patent Office Re. Application No. 307329. (3 Pages).

* cited by examiner

10'

36

38

40

18

26 j

32 r

16

12'

42 ← 20

116

24

10'

16

14

32

34 z r

30

12'

10

18

16

32

12

28

14

122

122

16c
16b
16a

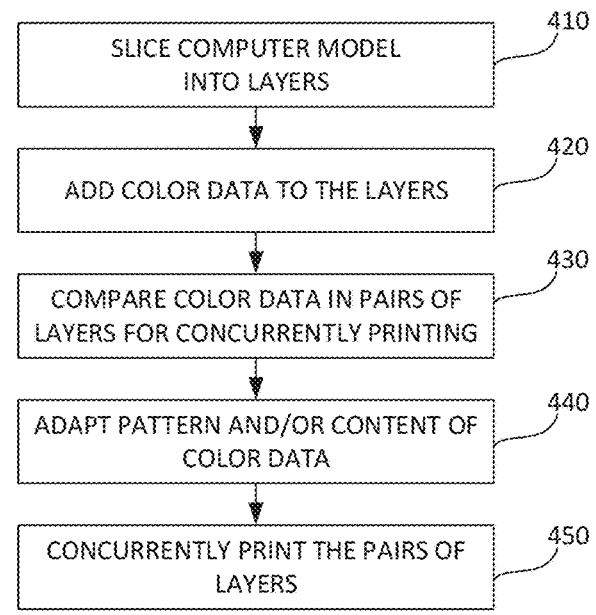

SLICE COMPUTER MODEL INTO LAYERS — 410

ADD COLOR DATA TO THE LAYERS — 420

COMPARE COLOR DATA IN PAIRS OF LAYERS FOR CONCURRENTLY PRINTING — 430

ADAPT PATTERN AND/OR CONTENT OF COLOR DATA — 440

CONCURRENTLY PRINT THE PAIRS OF LAYERS — 450

FIG. 9

| | WHITE (W) | CYAN (C) | MAGENTA (M) | YELLOW (Y) | BLACK (K) | CLEAR (T) | SUPPORT (S1, S2) |
|---|---|---|---|---|---|---|---|
| WHITE (W) | | | | | | | |
| CYAN (C) | C / W | | | | | | |
| MAGENTA (M) | M / W | M / C | | | | | |
| YELLOW (Y) | Y / W | Y / C | Y / M | | | | |
| BLACK (K) | K / W | K / C | K / M | K / Y | | | |
| CLEAR (T) | T / W | T / C | T / M | T / Y | T / B | | |
| SUPPORT (S1, S2) | S1/S2 / W | S1/S2 / C | S1/S2 / M | S1/S2 / Y | S1/S2 / K | S1/S2 / T | S1 / S2 |

FIG. 10

SYSTEM AND METHOD FOR HIGH THROUGHPUT THREE-DIMENSIONAL PRINTING

RELATED APPLICATIONS

This application is a National Phase of PCT Patent Application No. PCT/IL2022/050336 having International filing date of Mar. 28, 2022, which claims the benefit of priority under 35 USC § 119(e) of U.S. Provisional Patent Application No. 63/167,685 filed on Mar. 30, 2021. The contents of the above applications are all incorporated by reference as if fully set forth herein in their entirety.

FIELD AND BACKGROUND OF THE INVENTION

The present invention, in some embodiments thereof, relates to three-dimensional (3D) printing and, more particularly, but not exclusively, to a system and method for 3D color printing with improved throughput.

Three-dimensional (3D) printing is a technology enabling fabrication of objects directly from computer data. The basic operation of any 3D printing system consists of slicing a 3D computer model of an object into thin cross sections, e.g. slices, translating the result into two-dimensional position data and feeding the data to a 3D printer to fabricate the 3D object in a layerwise manner. The two-dimensional position data may be one or more image data files that define a shape of each layer. For color 3D printing, the image data file also defines a color for at least a portion of the pixels in the layer.

The 3D printer may include a carriage or printing block carrying one or more printing heads for deposition of building material(s). Each of the printing heads may have one or more arrays of nozzles from which one or more building materials can be selectively dispensed onto a printing structure, i.e. tray or printing surface which may be a previously printed layer, to form one layer at a time. Each array of nozzles may be fed with material from a channel for dispensing a selected building material. Different channels may be used to dispense different building materials. Depending on the building material, the layers may then be cured or solidified using a suitable device that may also be carried on the carriage. The building material may include modeling material, which forms the object, and support material, which supports the object as it is being built. Different types or combinations of modeling materials e.g. different colored modeling materials may be used to fabricate the object. The carriage scans i.e., moves over the printing structure i.e. tray or printing surface, and patterns layers of building material(s). Each layer is formed by depositing one or more building materials along one or more passes (e.g. each pass having a width along the Y axis of about the width of the carriage or printing head). To print a layer of building materials along a specific pass, the carriage advances or travels in a scan direction (e.g. X-axis) and the printing heads selectively dispense building material(s). In some embodiments of the invention, for instance, when the size of the 3D object to be printed requires several deposition passes, the carriage may shift in a cross-scan direction (e.g. Y-axis) to position the printing heads over an additional pass of the layer. A pass of a layer may be completed with a single travel of the carriage over the pass or may be completed over a plurality of travels of the carriage over the pass, e.g. back and forth or back and forth twice. The carriage may be offset in the cross-scan direction between travels of a single pass to dispense droplets between droplets dispensed in a previous travel, thereby increasing the printing resolution.

The time it takes to complete fabrication of an object with 3D printing may depend on a number of parameters including size of the object being printed, layer thickness and number of nozzles available to concurrently dispense (or deposit) building material, as well as a flow capacity of each nozzle. Some known 3D printing systems allow a user to select a high-speed printing mode.

For instance, U.S. Pat. No. 9,718,238 entitled "System and method for depositing liquids." the contents of which are incorporated herein by reference discloses a printing head which provides a high-speed printing mode while maintaining low amount of waste. It is described that while the 3D printing system is designed for printing objects from several printing materials, the user may decide to print an object using a smaller number of materials. For example, it may be desired to print an object using only one modeling material. In such a case, for faster printing, multiple heads may be used for printing the same material, thereby providing a high-speed printing mode. When it is desired to use a printing head for printing a material which is different from the material which was previously deposited by the same printing head, it is oftentimes required to flush the printing head and the respective supply duct until the previously deposited material is removed and/or completely replaced. The printing head disclosed includes at least two compartments that are in controllable fluid communication with each other. It is described that the advantage of connecting the compartments to separate liquid containers, while maintaining the ability to establish fluid communication among the compartments, is that it significantly reduces the amount of waste when the same material is deposited from two different compartments.

SUMMARY OF THE INVENTION

Known methods for increasing the throughput of a 3D printer include using printing heads that provide a higher flow capacity and/or increasing the number of channels that are used for dispensing each type of building material, e.g. using two channels per building material. Generally, higher flow capacity printing heads are associated with higher cost. Increasing the throughput based on using two channels to dispense each type of building materials may be practical for monochrome printing or for printing with a limited number of modeling materials, e.g. a limited number of colors but may be less practical as the number of different modeling materials needed for constructing the object increases, for example for full color printing. Increasing the number of channels per modeling material (e.g. color and/or type) is also accompanied by an increase in cost, an increase in the complexity of the 3D printing system as well as an increase in the footprint of the 3D printing system, all of which are typically undesirable.

According to some aspects of some example embodiments, there is provided a system and method for high throughput 3D color printing without the need to replace the printing heads with higher cost printing heads that provide superior flow capacity and without the need to significantly increase the number of printing channels and/or printing heads included in the carriage. Optionally, the throughput for 3D color printing may be doubled (or nearly doubled) based on the system and method described herein. Optionally, double throughput (or near double throughput) printing is achieved without the need to add printing heads to a carriage (or printing block) that is already configured for color printing. Optionally, the high throughput 3D color printing is achieved with eight channels that include two channels of support material (S), one channel of clear modeling material (T) and a plurality of channels including a set of colors, e.g. white (W), black (K), cyan (C), magenta (M) and yellow (Y). Other sets of colors may be used. According to some example embodiments, two channels are configured to selectively dispense material at a same target location over a same travel, to increase the volume of material dispensed per travel of the carriage during printing, and thus increase throughput. In some example embodiments, a clear modeling material or a support material is selectively dispensed at a same target location as a colored modeling material. Optionally, the pattern and quantity of clear modeling material or support material dispensed is defined to increase throughput without significantly deteriorating the color quality and printing resolution of the final object being printed. In some example embodiments, two different colored modeling materials are selectively dispensed at a same target location to provide a desired digital mix of colors. According to some example embodiments, the system and methods provide for switching between operating in standard color printing mode with one dispensed drop per target location, and high throughput color printing mode with two dispensed drops per target location. Optionally, the switching is based on user selection.

According to an aspect of some example embodiments, there is provided a method for 3D color printing of an object, the method comprising: slicing a 3D model of the object; adding color data to slices of the 3D model; and printing the slices with a printing block including a plurality of channels, the plurality including channels each with a different colored building material and a channel with a clear building material, wherein the printing includes dispensing at each target location of a travel of the printing block, building material from two channels of the plurality of channels, the two channels per target location being selected based on the color data.

Optionally, the printing includes dispensing both clear building material and one of the colored building materials at a first target location of the travel based on the color data indicating the one of the colors in the first target location.

Optionally, the printing includes dispensing two different colored building materials at a second target location of the travel based on the color data indicating a digital mix that includes the two different colored building materials in the second target location.

Optionally, the printing block additionally includes two channels with support material and wherein the printing includes dispensing the support material from each the two channels of support material at a third target location of the travel.

Optionally, the printing includes dispensing both the support material from one of the two channels and one of the colored building materials at a fourth target location of the travel.

Optionally, the method includes adjusting the color data to accommodate dispensing at each target location of the travel of the printing block, the building material from two channels of the plurality of channels.

Optionally, the adjusting includes replacing at least one pixel of the color data defining one of the colored modeling materials with a pixel defining clear modeling material.

Optionally, the adjusting includes altering a pattern of colored pixels configured to define a digital mix of colors.

Optionally, a value of each pixel of the color data is configured to indicate printing with a defined pair of channels from the plurality of channels.

Optionally, the method includes concurrently dispensing building material from a pair of the slices based on the color data.

Optionally, dispensing at each target location of a travel of the printing block from the two channels includes dispensing from one channel selected based on the color data of one slice of the pair and dispensing from another channel selected based on the color data of the other slice of the pair.

Optionally, the method includes adapting the color data in the pair to eliminate redundancies of colors in corresponding pixels of the pair.

Optionally, the channels with different colored building materials includes cyan, yellow, magenta, white and black modeling material.

Optionally, the white modeling material includes a higher pigment concentration as compared to at least one other colored modeling material to compensate for color dilution when adding clear modeling material to target locations defined to include white modeling material.

Optionally, the method includes switching between dispensing at each target location of a travel building material from two channels of the plurality of channels to dispensing at each target location of a travel building material from one channel of the plurality of channels.

Optionally, the switching is based on user selection.

Optionally, the switching is accompanied with replacing building material in one of two channels including support material with modeling material.

According to an aspect of some example embodiments, there is provided a system for 3D color printing of an object comprising: a printing block including at least one printing head including a plurality of channels each with a different colored building material and a channel with a clear building material; a data processor configured to: slice a 3D model of the object to be printed; and add color data to slices of the 3D model; and a controller configured to control printing the slices wherein the printing includes dispensing at each target location of a travel of the printing block, building material from two channels of the plurality of channels, the two channels per target location selected based on the color data.

Optionally, the printing includes dispensing both clear building material and one of the colored building materials at a first target location of the travel based on the color data indicating the one of the colors in the first target location.

Optionally, the printing includes dispensing two different colored building materials at a second target location of the travel based on the color data indicating a digital mix that includes the two different colored building materials in the second target location.

Optionally, the printing block additionally includes two channels with support material and wherein the printing includes dispensing the support material from each the two channels of support material at a third target location of the travel.

Optionally, the printing includes dispensing both the support material from one of the two channels and one of the colored building materials at a fourth target location of the travel.

Optionally, the data processor is configured to adjust the color data to accommodate dispensing at each target location of the travel of the printing block, the building material from two channels of the plurality of channels.

Optionally, the adjusting includes replacing at least one pixel of the color data defining one of the colored modeling materials with a pixel defining clear modeling material.

Optionally, the adjusting includes altering a pattern of colored pixels configured to define a digital mix of colors.

Optionally, a value of each pixel of the color data is configured to indicate printing with a defined pair of channels from the plurality of channels.

Optionally, the controller is configured to concurrently dispense building material based on color data from a pair of the slices.

Optionally, dispensing at each target location of a travel of the printing block from the two channels includes dispensing from one channel selected based on the color data of one slice of the pair and dispensing from another channel selected based on the color data of the other slice of the pair.

Optionally, the data processor is configured to adjust the color data in the pair to eliminate redundancies of colors in corresponding pixels of the pair.

Optionally, the channels with different colored building materials includes cyan, yellow, magenta, white and black modeling material.

Optionally, the white modeling material includes a higher pigment concentration as compared to at least one other colored modeling material to compensate for color dilution when adding clear modeling material to target locations defined to include white modeling material.

Optionally, the controller is configured to switch between dispensing at each target location of a travel building material from two channels of the plurality of channels to dispensing at each target location of a travel building material from one channel of the plurality of channels.

Optionally, the switching is based on user selection.

Optionally, the switching is accompanied with replacing building material in one of two channels including support material with modeling material.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings and images. With specific reference now to the drawings and images in detail, it is stressed that the particulars shown are by way of example and for purposes of illustrative discussion of embodiments of the invention. In this regard, the description taken with the drawings and images makes apparent to those skilled in the art how embodiments of the invention may be practiced.

In the drawings:

FIG. 9 is a simplified flow chart of an example method for high-throughput color printing;

FIG. 10 is a chart showing example pairs of building materials that may be dispensed at a same target location over a single travel of a 3D printer in accordance with some example embodiments;

Figure 13:
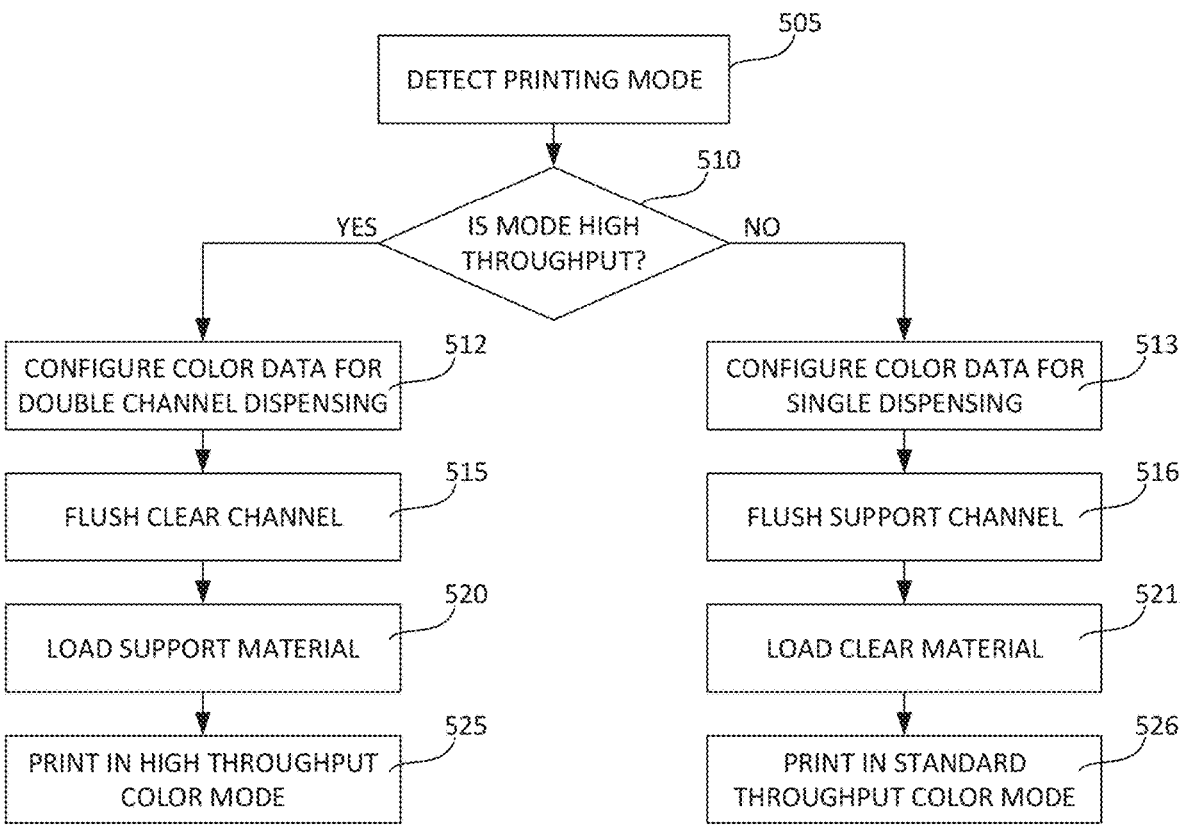
Figure 14A:
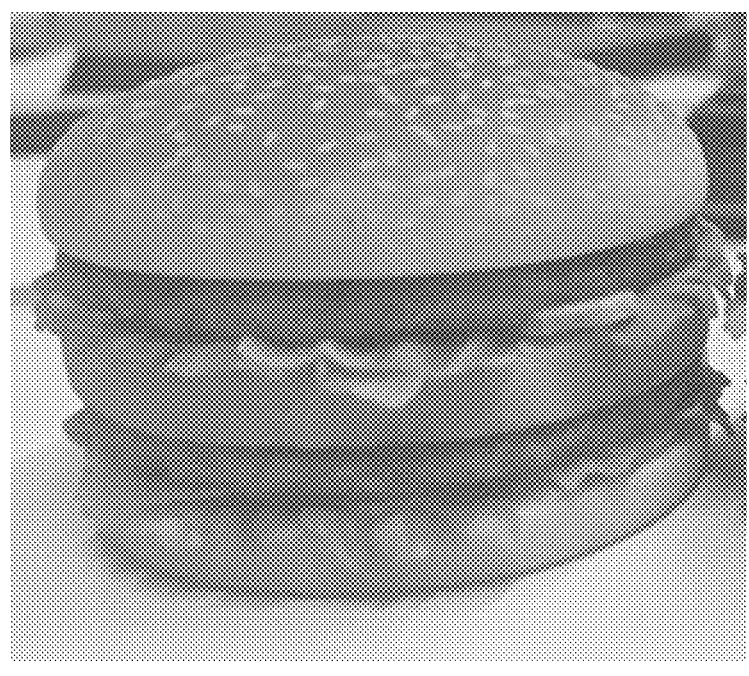
Figure 14B:
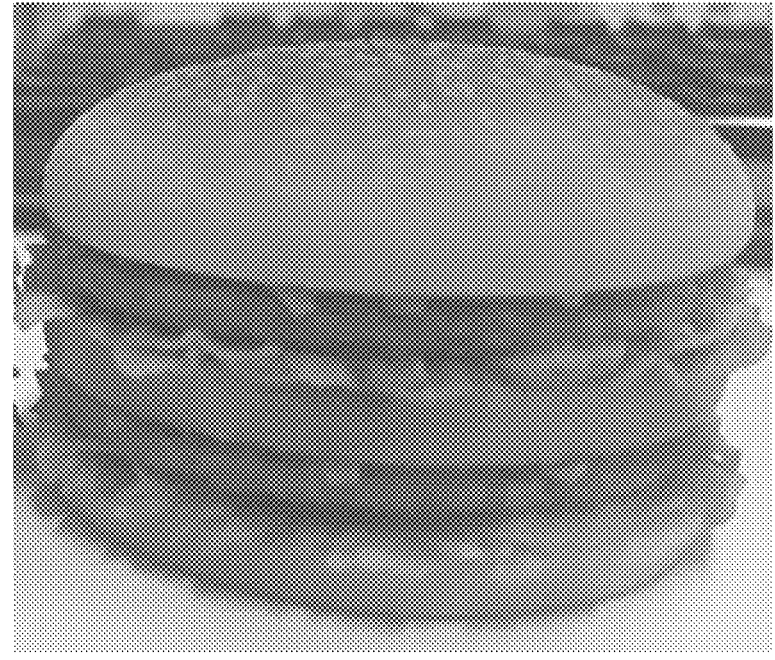

FIG. 13 is a simplified flow chart of an example method to selectively switch between regular throughput color printing and high throughput color printing in accordance with some example embodiments; and FIGS. 14A and 14B are images of an example object printed with standard 3D color printing as known in the prior art (FIG. 14A) and with high throughput 3D color printing in accordance with some example embodiments (FIG. 14B).

DESCRIPTION OF SPECIFIC EMBODIMENTS OF THE INVENTION

The present invention, in some embodiments thereof, relates to three-dimensional (3D) color printing and, more particularly, but not exclusively, to a system and method for 3D color printing with improved throughput.

According to an aspect of some example embodiments, there is provided a 3D printing system that provides high throughput 3D color printing based on doubling the number of drops that may be dispensed per travel of the 3D printer. According to some example embodiments, the double dispensing is achieved by dispensing building material from two different printing head channels (belonging to the same printing head or to two different printing heads) at the same locations over a same travel. According to some example embodiments, high throughput 3D color printing is achieved with a carriage that includes one channel for dispensing clear modeling material, a plurality of channels for dispensing different colored modeling materials, e.g. one channel per color, and two channels both dispensing support material (s). Optionally, the channels for dispensing colored modeling materials include channels of W. K. C. Y and M colored materials. In other examples, a different set of colors is used to provide color printing. Materials from each channel may be dispensed via an array of nozzles.

According to some example embodiments, double dispensing, e.g. dispensing from two distinct channels at a same location may comprise support material(s) dispensed from two different channels, or a colored modeling material paired with a clear modeling material or a support material, each material being dispensed from a different channel, or may comprise a pair of different colored modeling materials, each material being dispensed from a different channel. The pair of different colored modeling materials may be selected to provide a desired digital mix of colors.

The double channel dispensing (double drop from two distinct channels) at target locations may increase a rate at which an object is printed based on increasing thickness of a layer or based on reducing a number of travels used to complete a pass and without compromising a resolution of the printing, e.g. without compromising the number of dots per inch (DPI). For example, a standard 3D color printing mode may provide forming a single layer, e.g. 27 µm layer with four travels per pass. In comparison, a high throughput mode as described herein, may provide forming a double layer, e.g., 55 µm layer with four travels per pass or may provide forming a single layer, e.g., 27 µm layer with two travels per pass. Both options may provide full color printing with a same number of DPI.

According to some example embodiments, in a high throughput 3D color printing mode, a 3D printing system defines pairs of contiguous slices that are to be concurrently printed. According to some example embodiments, color data in the pairs of contiguous slices is adjusted to avoid a situation that would require using a same channel twice to deposit material at a same location over a same travel. In some example embodiments, pixels in the pair of contiguous slices, e.g. image data files may be compared and adjustments may be made in one or more of the pair of image data files to accommodate concurrently printing the pair of contiguous layers. For example, if the color data of the pair of layers originally define a same modeling material, e.g. same color at a same location in the image data file, the color data for one of the layers may be adjusted to indicate using clear modeling material or support material instead of the same color modeling material (or pigmented modeling material) at that location. In another example, if both slices define support material at a same location, the image data file may be adjusted to define a different, e.g. second channel for support material for each of the layers at that location. In yet another example, if the data defines a color that is a mix of colors available in the carriage, e.g. a mix of two colors, the image data file may arrange the colors with no overlap of colors between layers at a same location.

According to some example embodiments, the image data file provided to the 3D printer may define pairs of colors (or channels) instead of individual colors per pixel. Optionally, each pair of colors (or channels) may be assigned a value that defines the pair. Optionally, the printing system stores a table (or list) that lists all possible pairs of channels, e.g. all possible values that may be used to deposit material at a same location and each pixel in the image data file is assigned a value corresponding to a pair of colors (or channels) instead of a single color (or channel). In such embodiments, a 3D model to be printed, originally described with a set of n slices with a single color being assigned at each location of a slice can now be described with a set of n/2 slices and a pair of colors assigned at each single location of a slice. This may be particularly advantageous for reducing the amount of data handled by the 3D printing system as well as for reducing the computation time and/or printing time.

Optionally, pixels in the image data file may be formed with a plurality of drops of modeling material, e.g. four droplets of modeling material or more than four drops. Optionally, a pixel defines a digital color that can be formed with a plurality of droplets from different channels. Optionally, the pattern of the plurality of droplets may be defined to avoid overlap between modeling materials. Optionally, clear modeling material may be integrated into the plurality of droplets to avoid overlap. Optionally, the clear modeling material may be selectively integrated into the model being printed to achieve a desired color quality and/or to reduce a change in color quality that may occur based on replacing one or more of the colored modeling material(s) with clear modeling material.

In some example embodiments, one or more of the modeling material formulations includes an increase in pigment concentration to compensate for any dilution that may occur when adding clear modeling material to target locations defined to include that color. The present inventors have found that white modeling may often be mixed with the clear material when printing in a high throughput mode as described herein, since white is often printed as a solid color. The present inventors have found that other colors, e.g. C. M. Y and K will typically appear in a model as part of a digitally mixed color and therefore may not require substantial addition of clear material. Optionally, the white modeling material may be a white modeling material with an increased pigment concentration to at least partially compensate for any dilution that may be expected to occur during a high throughput 3D color printing mode.

According to some example embodiments, there is provided a 3D printing system that is configured to provide printing in different modes including standard 3D color printing and high throughput 3D color printing. In some example embodiments, during standard 3D color printing only one of the channels includes support material and during high throughput 3D color printing, two channels include support material. Optionally, switching between modes may be accompanied by flushing one of the channels to toggle between dispensing support material and dispensing a selected modeling material. The selected modeling material may optionally be a flexible, rigid, transparent and/or colored modeling material. The selected modeling material may be for instance a material selected from Stratasys Ltd. Vero™, VeroUltra™, or Agilus30™ material families (e.g. VeroUltra™ Clear). According to some example embodiments, switching between modes is accompanied by switching an algorithm used to define the pixels in the individual slices.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC)

format, an OBJ File format (OBJ), a 3D Manufacturing Format (3MF), Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by a 3D printer which scans a two-dimensional surface, also referred to herein as a tray, or a working surface (which may include a previous, already printed layer), and patterns layers upon it. While scanning, the 3D printer visits a plurality of target locations on the surface, and decides, for each target location or a group of target locations, whether or not the target location or group of target locations is to be occupied by building material formulation, and which type of building material formulation is to be delivered thereto. The decision is made according to a computer image of the layer to be patterned on the surface.

In some embodiments of the present invention the 3D printer comprises inkjet printing. In these embodiments a building material is dispensed from an inkjet printing head having one or more arrays of nozzles to deposit building material in layers on a printing structure i.e. printing surface or tray. The 3D printer thus dispenses building material in target locations which are to be occupied and leaves other target locations void. The 3D printer typically includes a plurality of printing heads having one or more arrays of nozzles, each of which can be configured to dispense a different building material. This is typically achieved by providing the printing head with a plurality of fluid channels that are separated from each other, wherein each fluid channel receives a different building material through a separate inlet and conveys it to a different array of nozzles.

Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in 3D printing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different modeling material formulations, each material formulation from a different array of nozzles (belonging to the same or different printing heads) of the 3D printer. In some embodiments, two or more such arrays of nozzles that dispense different modeling material formulations are both located in the same printing head of the 3D printer. In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are each located in separate printing heads.

Figure 1A:
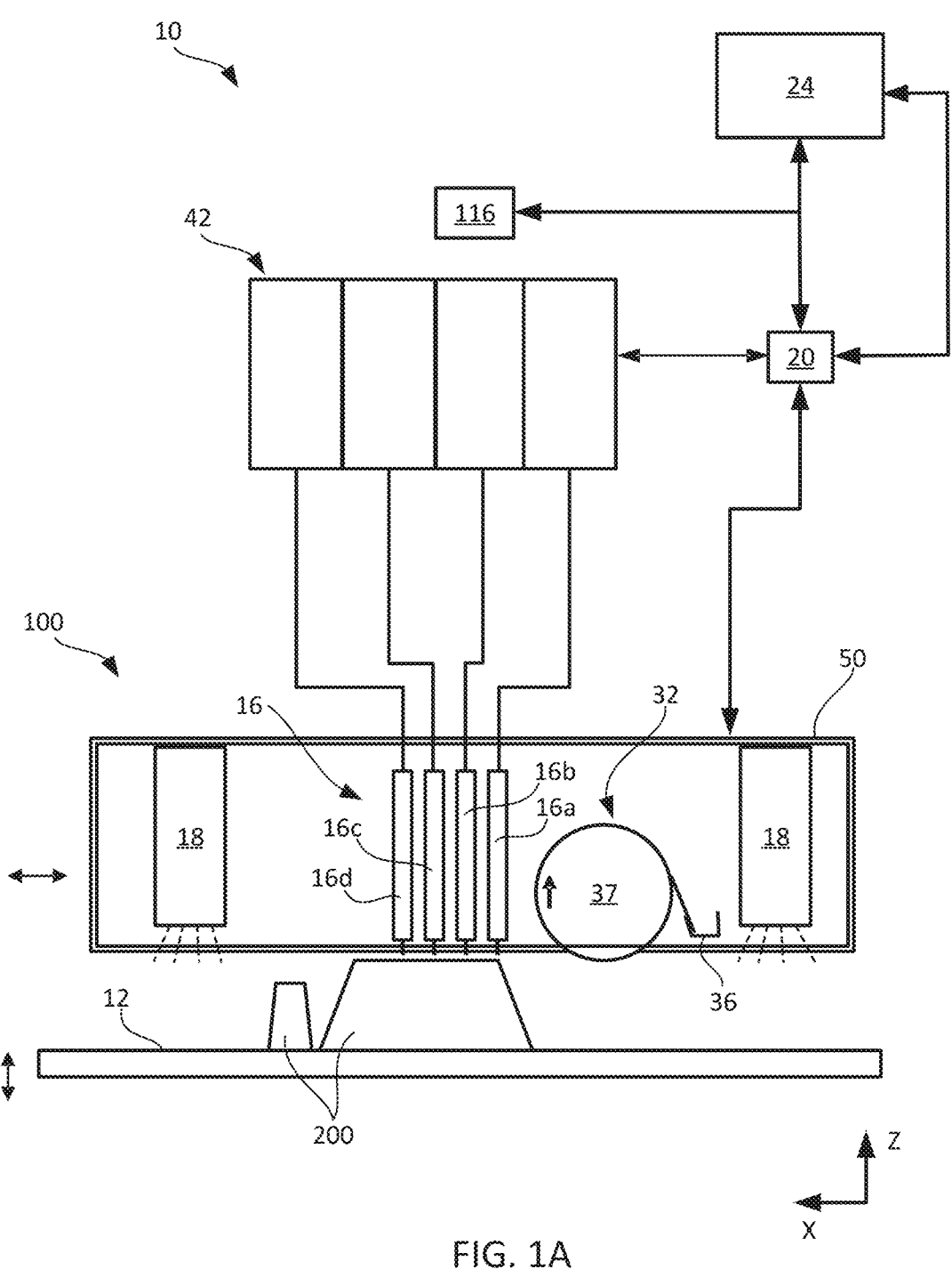
FIGS. 1A-1D are schematic illustrations of a 3D printing system according to some example embodiments.
Figure 2A:
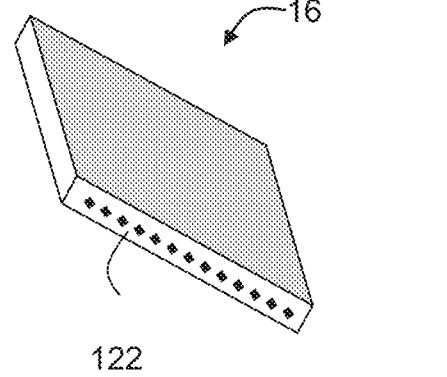
FIGS. 2A-2C are schematic illustrations of printing heads according to some example embodiments.
Figure 2B:
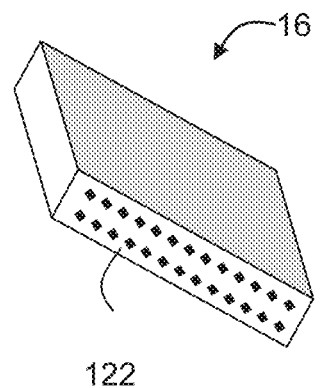
Figure 2C:
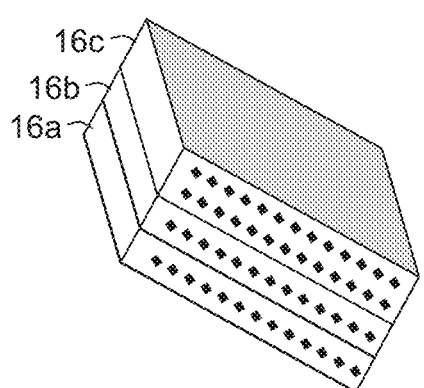

A representative and non-limiting example of a 3D printing system 10 suitable for printing an object 200 according to some embodiments of the present invention is illustrated in FIG. 1A. System 10 comprises a 3D printer 100 having a dispensing unit 16 which comprises a plurality of printing heads. Each head preferably comprises one or more nozzle arrays 122, typically mounted on an orifice plate as illustrated in FIGS. 2A-C described below, through which a liquid building material formulation is dispensed.

Each printing head is optionally and preferably fed via one or more building material formulation reservoirs which may optionally include a temperature controller (e.g., a temperature sensor and/or a heating device), and a material formulation level sensor. To dispense the building material formulation, a voltage signal is applied to the printing heads to selectively deposit droplets of material formulation via the printing head nozzles, for example, as in piezoelectric inkjet printing technology. Another example includes thermal inkjet printing heads. In these types of heads, there are heater elements in thermal contact with the building material formulation, for heating the building material formulation to form gas bubbles therein, upon activation of the heater elements by a voltage signal. The gas bubbles generate pressures in the building material formulation, causing droplets of building material formulation to be ejected through the nozzles. Piezoelectric and thermal printing heads are known to those skilled in the art of solid freeform fabrication. For any types of inkjet printing heads, the dispensing rate of the head depends on the number of nozzles, the type of nozzles and the applied voltage signal rate (frequency).

Optionally, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four printing heads 16a, 16b, 16c and 16d are illustrated. Each of printing heads 16a, 16b, 16c and 16d has a nozzle array 122. In this Example, printing heads 16a and 16b can be designated for modeling material formulation/s and printing heads 16c and 16d can be designated for support material formulation. Thus, printing head 16a can dispense one modeling material formulation, head 16b can dispense another modeling material formulation and heads 16c and 16d can both dispense support material formulation. In an alternative embodiment, heads 16c and 16d, for example, may be combined in a single head having two nozzle arrays for depositing support material formulation. In a further alternative embodiment any one or more of the printing heads may have more than one nozzle arrays for depositing more than one material formulation, e.g. two nozzle arrays (i.e., dual channel print head) for depositing two different modeling material formulations or a modeling material formulation and a support material formulation, each formulation via a different array or number of nozzles.

Yet it is to be understood that it is not intended to limit the scope of the present invention and that the number of modeling material formulation printing heads (modeling heads) and the number of support material formulation printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

As used herein throughout the term "about" refers to +10%.

For example, for a=1, the overall dispensing rate of support material formulation is generally the same as the overall dispensing rate of the modeling material formulation when all the arrays of nozzles operate.

3D printer 100 can comprise, for example, M modeling heads each having m arrays of p nozzles, and S support heads each having s arrays of q nozzles such that M×m× p=S×s×q. Each of the M×m modeling arrays and S×s support arrays can be manufactured as a separate physical unit, which can be assembled and disassembled from the group of arrays. In this embodiment, each such array optionally and preferably comprises a temperature controller and a material formulation level sensor of its own, and receives an individually controlled voltage for its operation.

3D printer 100 can further comprise a solidifying device 18 which can include any device configured to emit light, heat or the like that may cause the deposited material formulation to harden. For example, solidifying device 18 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 18 serves for curing or solidifying the modeling material formulation.

In addition to solidifying device 18, 3D printer 100 optionally and preferably comprises an additional radiation source for solvent evaporation (not shown). This radiation source optionally and preferably generates infrared radiation. In various exemplary embodiments of the invention solidifying device 18 comprises a radiation source generating ultraviolet radiation. Radiation source 18 optionally generates infrared radiation.

In some embodiments of the present invention 3D printer 100 comprises a cooling system (not shown) such as one or more fans or the like.

The printing head(s) and radiation source are preferably mounted in a frame or block 50 which is preferably operative to reciprocally move over a tray 12, which serves as the working surface. In some embodiments of the present invention the radiation sources are mounted in the block such that they follow in the wake of the printing heads to at least partially cure or solidify the material formulations just dispensed by the printing heads. Tray 12 is positioned horizontally. According to the common conventions an X-Y-Z Cartesian coordinate system is selected such that the X-Y plane is parallel to tray 12. Tray 12 is preferably configured to move vertically (along the Z direction), typically downward. In various exemplary embodiments of the invention, 3D printer 100 further comprises one or more leveling devices 32. Optionally, leveling device includes a roller 37. Leveling device 32 serves to straighten, level and/or establish a thickness of the newly formed layer prior to the formation of the successive layer thereon. Leveling device 32 preferably includes a waste collection device 36 for collecting the excess material formulation generated during leveling. Waste collection device 36 may comprise any mechanism that delivers the material formulation to a waste tank or waste cartridge.

In use, the printing heads of dispensing unit 16 move in a scanning direction, which is referred to herein as the X direction, and selectively dispense building material formulation in a predetermined configuration in the course of their passage over tray 12. The building material formulation typically comprises one or more types of support material formulation and one or more types of modeling material formulation. The passage of the printing heads of dispensing unit 16 is followed by the curing of the modeling material formulation(s) by radiation source 18. In the reverse passage of the heads, back to their starting point for the layer just deposited, an additional dispensing of building material formulation may be carried out, according to predetermined configuration. In the forward and/or reverse passages of the printing heads, the layer thus formed may be straightened by leveling device 32, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 12 is lowered in the Z direction to a predetermined Z level, according to the desired thickness of the layer subsequently to be printed. The procedure is repeated to form three-dimensional object 200 in a layerwise manner.

In another embodiment, tray 12 may be displaced in the Z direction between forward and reverse passages of the printing head of dispensing unit 16, within the layer. Such Z displacement is carried out, for example in order to cause contact of the leveling device with the surface in one direction and prevent contact in the other direction.

System 10 optionally and preferably comprises a building material formulation supply system 42 which comprises the building material formulation containers or cartridges and supplies a plurality of building material formulations to 3D printer 100.

A controller 20 controls 3D printer 100 and optionally and preferably also supply system 42. Controller 20 typically includes an electronic circuit configured to perform the controlling operations. Controller 20 preferably communicates with a data processor 24 which transmits digital data pertaining to fabrication instructions based on computer object data, e.g., a CAD configuration represented on a computer readable medium in a form of a Standard Tessellation Language (STL) format or the like. Typically, controller 20 controls the voltage applied to each printing head or each nozzle array and the temperature of the building material formulation in the respective printing head or respective nozzle array.

Once the manufacturing data is loaded to controller 20 it can operate without user intervention. In some embodiments, controller 20 receives additional input from the operator, e.g., using data processor 24 or using a user interface 116 communicating with controller 20. User interface 116 can be of any type known in the art, such as, but not limited to, a keyboard, a touch screen and the like. For example, controller 20 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figures 1B, 1C:
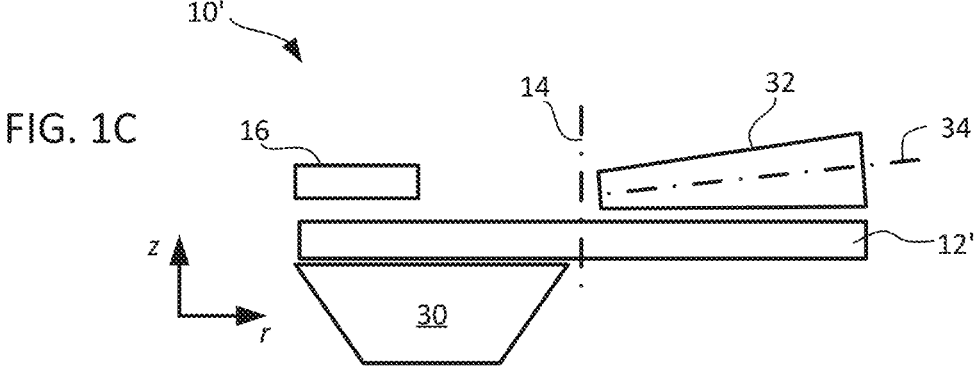
Figure 1D:
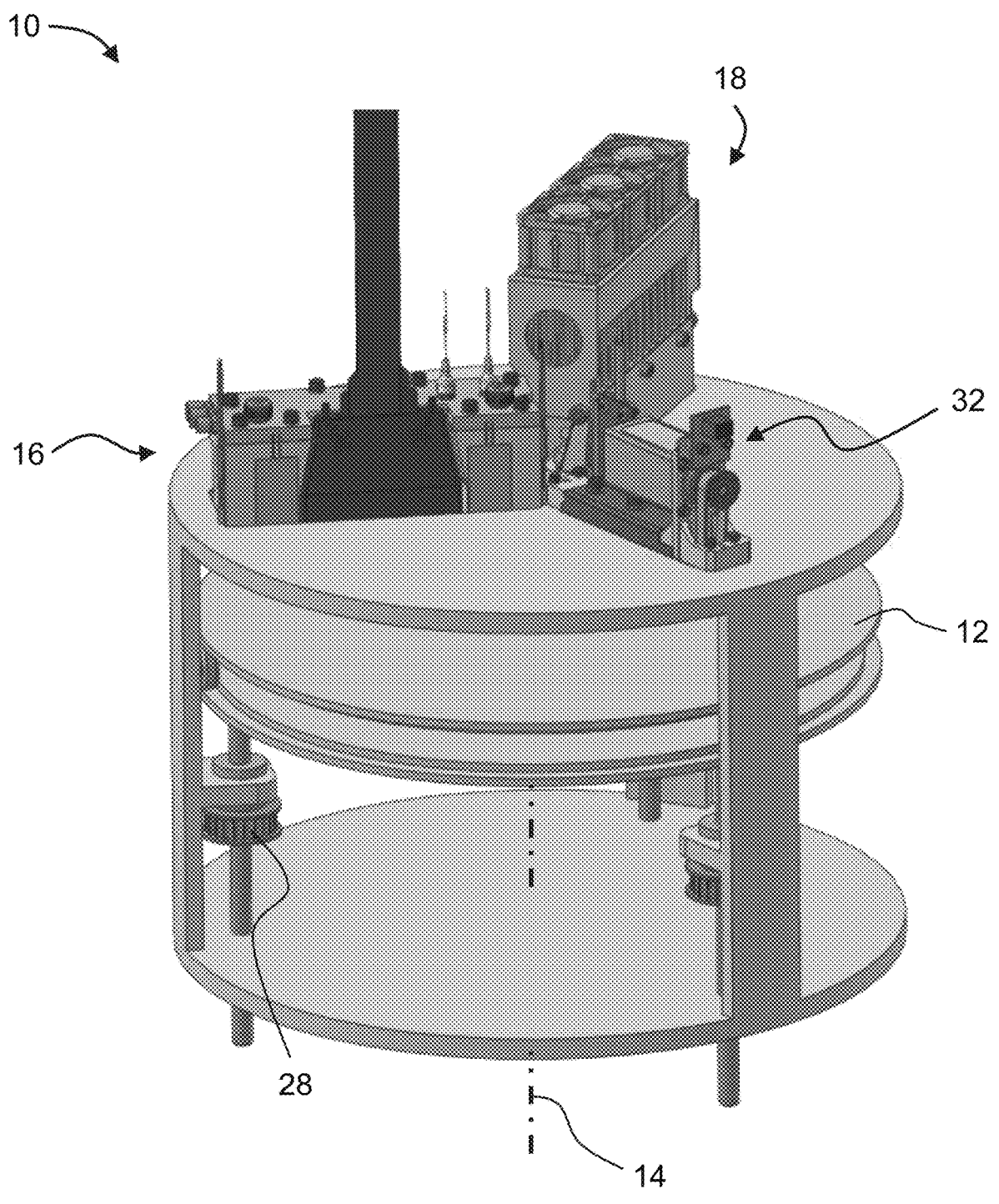

Another representative and non-limiting example of a system 10' suitable for 3D printing of an object according to some embodiments of the present invention is illustrated in FIGS. 1B-D. FIGS. 1B-D illustrate a top view (FIG. 1B), a side view (FIG. 1C) and an isometric view (FIG. 1D) of system 10'.

In the present embodiments, system 10' comprises a tray 12' and a dispensing unit including a plurality of inkjet printing heads 16, each having one or more nozzle arrays with respective one or more pluralities of separated nozzles. The material used for the three-dimensional printing is supplied to dispensing unit by a building material supply system 42. Tray 12' can have a shape of a disk or it can be annular. Non-round shapes are also contemplated, provided they can be rotated about a vertical axis.

Tray 12' and printing heads 16 are optionally and preferably mounted such as to allow a relative rotary motion between tray 12' and printing heads 16. This can be achieved by (i) configuring tray 12' to rotate about a vertical axis 14 relative to printing heads 16, (ii) configuring printing heads 16 to rotate about vertical axis 14 relative to tray 12', or (iii) configuring both tray 12' and printing heads 16 to rotate about vertical axis 14 but at different rotation velocities (e.g., rotation at opposite direction). While some embodiments of system 10' are described below with a particular emphasis to configuration (i) wherein the tray is a rotary tray that is configured to rotate about vertical axis 14 relative to printing heads 16, it is to be understood that the present application contemplates also configurations (ii) and (iii) for system 10'. Any one of the embodiments of system 10' described herein can be adjusted to be applicable to any of configurations (ii) and (iii), and one of ordinary skills in the art, provided with the details described herein, would know how to make such adjustment.

In the following description, a direction parallel to tray 12' and pointing outwardly from axis 14 is referred to as the radial direction r, a direction parallel to tray 12' and perpendicular to the radial direction r is referred to herein as the azimuthal direction φ, and a direction perpendicular to tray 12' is referred to herein is the vertical direction z.

The term "radial position," as used herein, refers to a position on or above tray 12' at a specific distance from axis 14. When the term is used in connection to a printing head, the term refers to a position of the head which is at specific distance from axis 14. When the term is used in connection to a point on tray 12', the term corresponds to any point that belongs to a locus of points that is a circle whose radius is the specific distance from axis 14 and whose center is at axis 14.

The term "azimuthal position," as used herein, refers to a position on or above tray 12' at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12' serves as a building platform for three-dimensional printing. The working area on which one or objects are printed is typically, but not necessarily, smaller than the total area of tray 12'. In some embodiments of the present invention the working area is annular. The working area is shown at 26. In some embodiments of the present invention tray 12' rotates continuously in the same direction throughout the formation of object, and in some embodiments of the present invention tray reverses the direction of rotation at least once (e.g., in an oscillatory manner) during the formation of the object. Tray 12' is optionally and preferably removable. Removing tray 12' can be for maintenance of system 10', or, if desired, for replacing the tray before printing a new object. In some embodiments of the present invention system 10' is provided with one or more different replacement trays (e.g., a kit of replacement trays), wherein two or more trays are designated for different types of objects (e.g., different weights) different operation modes (e.g., different rotation speeds), etc. The replacement of tray 12' can be manual or automatic, as desired. When automatic replacement is employed, system 10' comprises a tray replacement device 36 configured for removing tray 12' from its position below printing heads 16 and replacing it by a replacement tray (not shown). In the representative illustration of FIG. 1B tray replacement device 36 is illustrated as a drive 38 with a movable arm 40 configured to pull tray 12', but other types of tray replacement devices are also contemplated.

Exemplified embodiments for the printing heads 16 are illustrated in FIGS. 2A-2C. These embodiments can be employed for any of the 3D printing systems described above, including, without limitation, system 10 and system 10'.

FIGS. 2A-B illustrate a printing head 16 of a dispensing unit with one (FIG. 2A) and two (FIG. 2B) nozzle arrays 122. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 10 is employed, all printing heads 16 in the dispensing unit are optionally and preferably oriented along the indexing direction with their positions along the scanning direction being offset to one another.

When a system similar to system 10' is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A dispensing unit including several inkjet printing heads 16a, 16b, 16c is illustrated in FIG. 2C.

In some embodiments, system 10' comprises a stabilizing structure 30 positioned below printing heads 16 such that tray 12' is between stabilizing structure 30 and printing heads 16. Stabilizing structure 30 may serve for preventing or reducing vibrations of tray 12' that may occur while inkjet printing heads 16 operate. In configurations in which printing heads 16 rotate about axis 14, stabilizing structure 30 preferably also rotates such that stabilizing structure 30 is always directly below printing heads 16 (with tray 12' between printing heads 16 and stabilizing structure 30).

Tray 12' and/or printing heads 16 is optionally and preferably configured to move along the vertical direction z, parallel to vertical axis 14 so as to vary the vertical distance between tray 12' and printing heads 16. In configurations in which the vertical distance is varied by moving tray 12' along the vertical direction, stabilizing structure 30 preferably also moves vertically together with tray 12'. In configurations in which the vertical distance is varied by 16 along the vertical direction, while maintaining the vertical position of tray 12' fixed, stabilizing structure 30 is also maintained at a fixed vertical position.

The vertical motion can be established by a vertical drive 28. Once a layer is completed, the vertical distance between tray 12' and printing heads 16 can be increased (e.g., tray 12' is lowered relative to printing heads 16) by a predetermined vertical step, according to the desired thickness of the layer subsequently to be printed. The procedure is repeated to form a three-dimensional object in a layerwise manner.

The operation of printing heads 16 and optionally and preferably also of one or more other components of system 10', e.g., the motion of tray 12', are controlled by a controller 20. Controller 20 can have an electronic circuit and a non-volatile memory medium readable by the circuit, wherein the memory medium stores program instructions which, when read by the circuit, cause the circuit to perform control operations as further detailed below.

Controller 20 can also communicate with a data processor 24 which transmits digital data pertaining to fabrication instructions based on computer object data, e.g., in a form of a Standard Tessellation Language (STL) or a Stereo-Lithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, data processor 24 preferably executes a procedure for transforming the coordinates of each slice in the computer object data from a Cartesian system of coordinates into a polar system of coordinates. Data processor 24 optionally and preferably transmits the fabrication instructions in terms of the transformed system of coordinates. Alternatively, data processor 24 can transmit the fabrication instructions in terms of the original system of coordinates as provided by the computer object data, in which case the transformation of coordinates is executed by the circuit of controller 20.

Figure 3A:
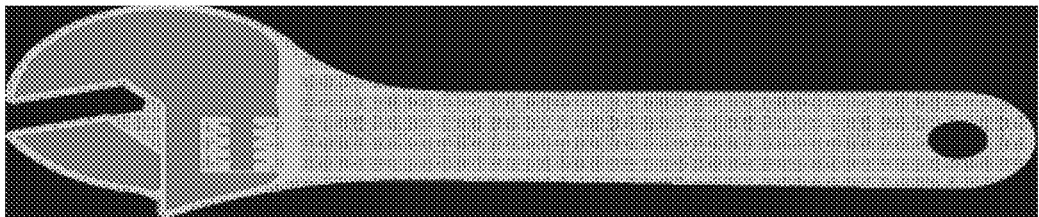
FIGS. 3A and 3B are schematic illustrations demonstrating coordinate transformations according to some embodiments of the present invention.
Figure 3B:
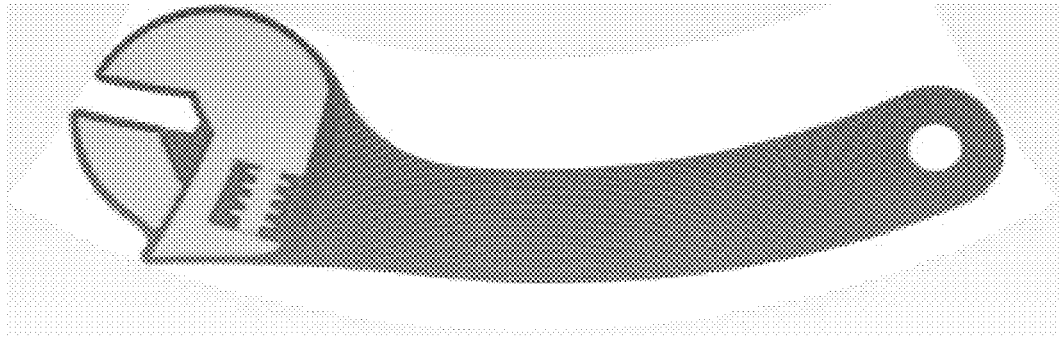

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10', unlike non-rotary systems, not all the nozzles of the head points cover the same distance over tray 12' during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10' based on the fabrication instructions and based on the stored program instructions as described below.

Generally, controller 20 controls printing heads 16 to dispense, during the rotation of tray 12', droplets of building material formulation in layers, such as to print a three-dimensional object on tray 12'.

System 10' optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10' further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12' and its surface is parallel to the surface of the tray. This embodiment is illustrated in the side view of system 10' (FIG. 1C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12').

The operation of leveling device 32 is optionally and preferably controlled by controller 20 which may activate and deactivate leveling device 32 and may optionally also control its position along a vertical direction (parallel to axis 14) and/or a radial direction (parallel to tray 12') and pointing toward or away from axis 14.

In some embodiments of the present invention printing heads 16 are configured to reciprocally move relative to tray along the radial direction r. These embodiments are useful when the lengths of the nozzle arrays 122 of the printing heads 16 are shorter than the width along the radial direction of the working area 26 on tray 12'. The motion of printing heads 16 along the radial direction is optionally and preferably controlled by controller 20.

Some embodiments contemplate the fabrication of an object by dispensing different material formulations from different arrays of nozzles (belonging to the same or different printing heads). These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations may be formed.

In some embodiments of the present invention the system dispenses digital material formulation for at least one of the layers.

The phrase "digital material formulations", as used herein and in the art, describes a combination of two or more material formulations on a pixel level or voxel level such that pixels or voxels of different material formulations are interlaced with one another over a region. Such digital material formulations may exhibit new properties that are affected by the selection of types of material formulations and/or the ratio and relative spatial distribution of two or more material formulations.

As used herein, a "voxel" of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, leveled, and solidified.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of a 3D printing system suitable for the present embodiments are found in U.S. Published Application No. 2010/0191360, the contents of which are hereby incorporated by reference.

Figure 4:
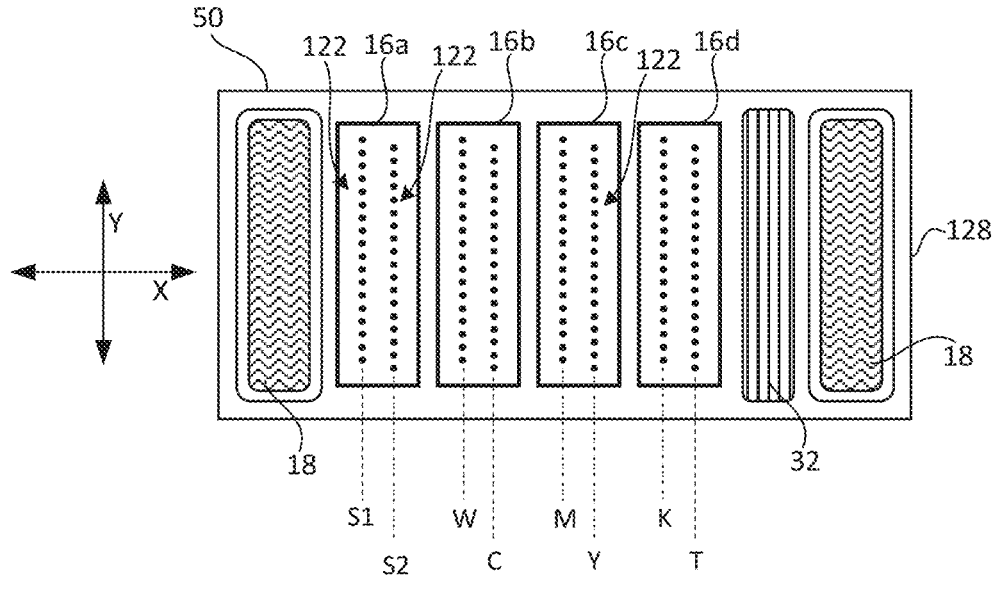
FIG. 4 is a simplified schematic drawing of an example carriage including a set of printing heads for high throughput color printing in accordance with some example embodiments.

Reference is now made to FIG. 4 showing a simplified schematic drawing of an example carriage including a set of printing heads for high throughput color printing in accordance with some example embodiments. According to some example embodiments, a printing block 50 (or a carriage) is loaded with a plurality of printing heads 16 for color printing in a high throughput mode. In the example shown in FIG. 4, printing block 50 is loaded with four printing heads, 16a, 16b, 16c and 16d and each printing head includes two arrays of nozzles 122, together providing eight distinct channels from which material may be dispensed.

Optionally, one or more of printing heads 16 may include only one array of nozzles 122 or more than two arrays of nozzles 122. Optionally, printing block 50 may be loaded with more or less than four printing heads 16. The number of printing heads may depend on the number of channels needed and the number of nozzle arrays 122 provided by each printing head 16. In some example embodiments, nozzles in one nozzle array 122 may be aligned in the scanning direction X with a corresponding nozzle in one or more other nozzle arrays 122. In some example embodiments, nozzles in one nozzle array 122 may be staggered along the cross-scan direction Y with a corresponding nozzle in one or more other nozzle arrays.

According to some example embodiments of the invention, high-throughput full color printing is enabled when printing block 50 is configured with two nozzle arrays 122 that dispense support material(s), one nozzle array 122 that dispenses a clear material and five nozzle arrays 122 that dispense color modeling materials. For example, the five nozzle arrays may include one nozzle array 122 that dispenses a white modeling material (W), one nozzle array 122 that dispenses a cyan modeling material (C), one nozzle array 122 that dispenses a magenta modeling material (M), one nozzle array 122 that dispenses a yellow modeling material (Y) and one nozzle array 122 that dispenses a black modeling material (K). Additional and/or alternative colors may be contemplated, e.g. orange and/or green. Optionally, the black modeling material (K) is absent and replaced with another modeling material, e.g. a flexible modeling material (F) from the Agilus30™ material family (Stratasys Ltd., Israel). Instead, black may be provided in the printed object by a digital mix of non-black colors (e.g., C, M and Y).

It is appreciated that the above configuration in which two nozzle arrays dispense the same type of building material can also be applied to cases in which two nozzle arrays dispense modeling material. Thus, for example, in some embodiments of the present invention two nozzle arrays dispense the aforementioned Vero™ modeling material, in some embodiments of the present invention two nozzle arrays dispense the aforementioned VeroUltra™ modeling material, in some embodiments of the present invention two nozzle arrays dispense the aforementioned Agilus30™ modeling material, etc. Also contemplated, are embodiments in which there are two nozzle arrays that dispense white modeling material. These embodiments are particularly useful when the white modeling material is used for color mixing with the flexible modeling material, in which case the amount of white modeling material that is used during the printed process is typically higher than other colors. When two nozzle arrays dispense white modeling material, the black modeling material is optionally and preferably absent, wherein black may be provided in the printed object by a digital mix of non-black colors.

In some embodiments, the building materials may be photopolymer materials that are cured with one or more radiation sources 18 located on printing block 50. Optionally, leveling device 32 serves to straighten, level and/or establish a thickness of the newly formed layer prior to the formation of the successive layer thereon and radiation sources 18 serves to cure the leveled material. Optionally, the leveling with leveling device 32 and/or the curing with radiation sources 18 is performed per travel of printing block 50 over tray 12. Optionally, printing block 50 is shifted in the cross-scan direction Y between travels as well as between passes. Optionally, the shift between travels of a same pass is defined to be a fraction of a distance between a pair of neighboring nozzles in nozzle array 122. Optionally, the shift between passes (or between travels of different passes) is defined to span a length of nozzle array 122.

Figure 5A:
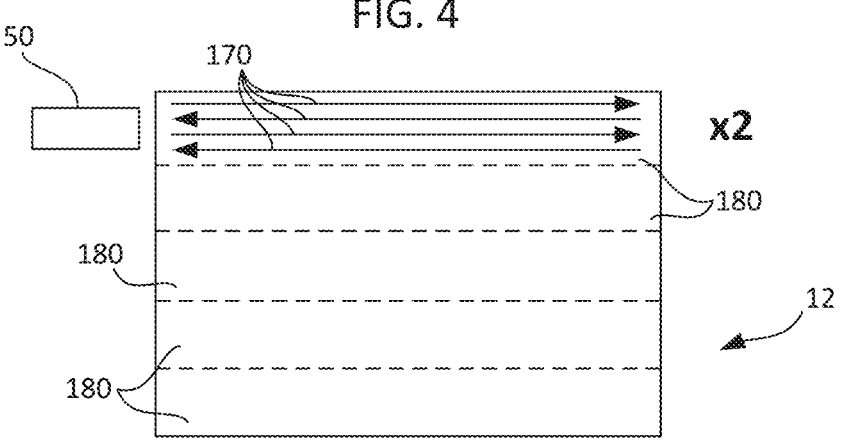
FIGS. 5A and 5B are simplified schematic drawings of two example travel paths of a printing block, both in accordance with some example embodiments.
Figure 5B:
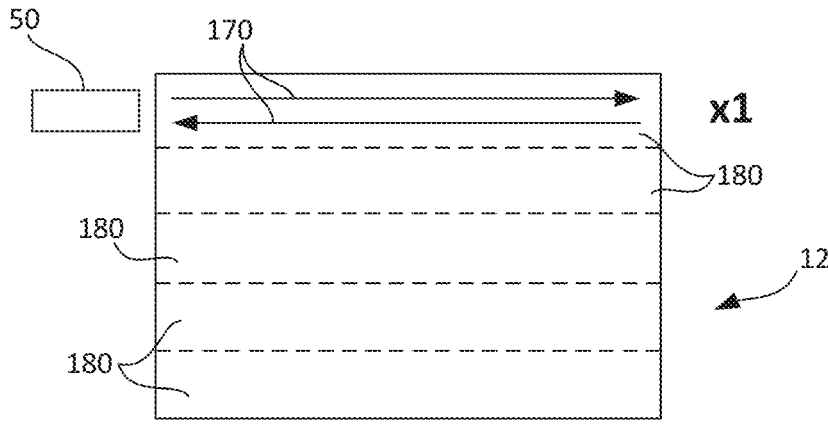
Figure 6A:
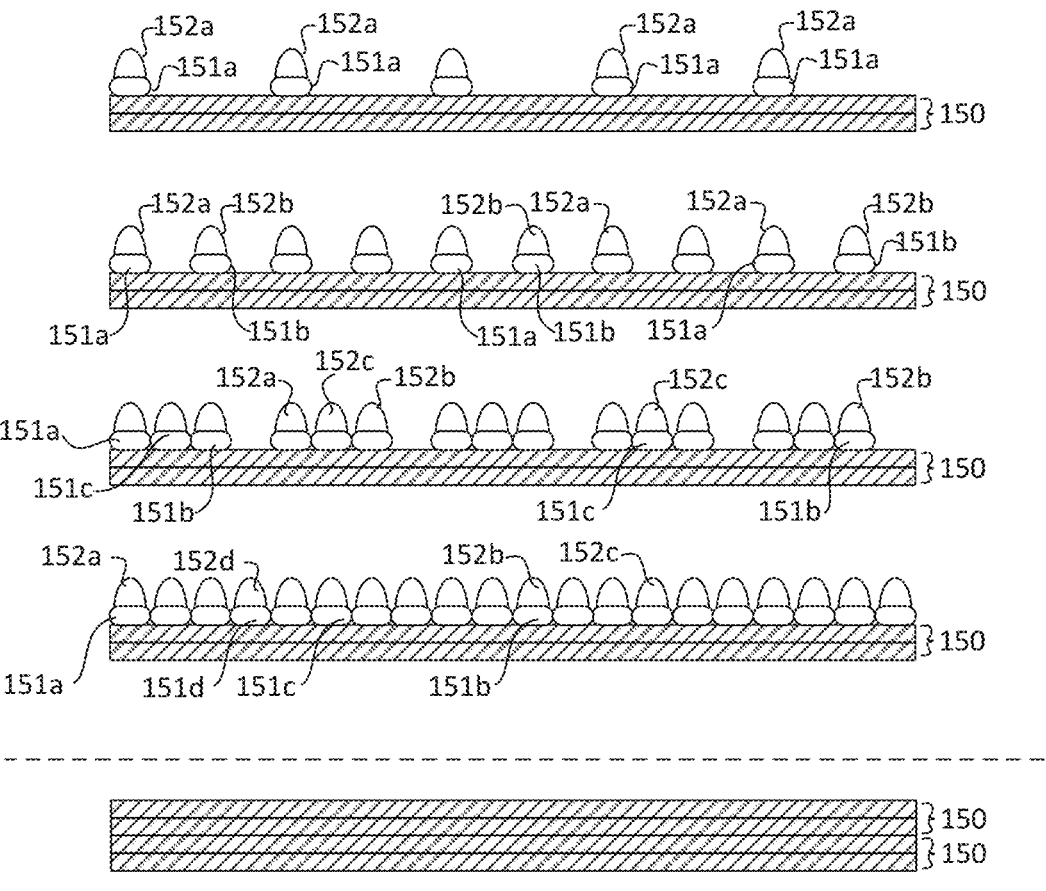
FIGS. 6A and 6B are time-lapse schematic illustrations of example dispensing patterns for concurrently forming a double layer over a plurality of travels in accordance with some example embodiments.
Figure 6B:
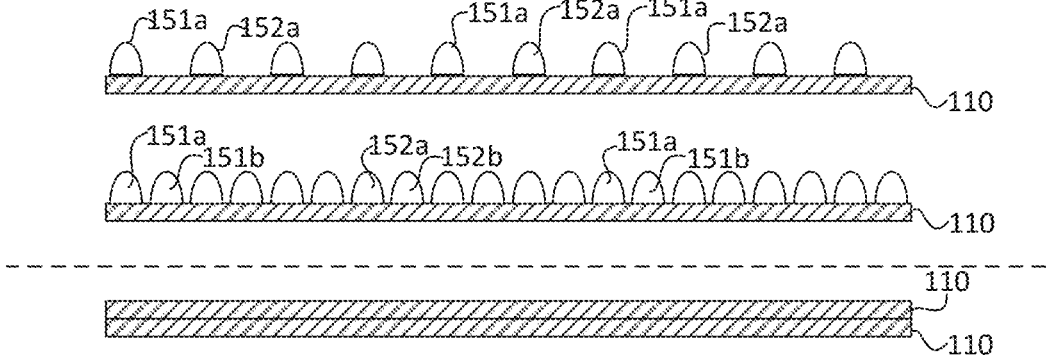

Reference is now made to FIGS. 5A and 5B showing simplified schematic drawings of two example travel paths of a printing block and to FIGS. 6A and 6B showing time-lapse schematic illustrations of example dispensing patterns for high throughput printing, all in accordance with some example embodiments. According to some example embodiments, high throughput printing is achieved by concurrently printing more than one layer at a time and/or based on decreasing the number of travels required for printing a layer. Printing heads in printing block 50 may dispense building material over a plurality of travels 170 per pass 180 and over a plurality of passes 180 to complete a single layer. Optionally, between travels 170 of a same pass 180, printing block 50 is shifted in the cross-scan direction Y by a fraction of a distance between a pair of neighboring nozzles in nozzle array 122 (e.g. a half of the nozzle pitch) to fill in spaces between droplets dispensed in a previous travel 170 and thereby increase the printing resolution. Once pass 180 is completed, printing block 50 may be shifted in the cross-scan direction Y to the next neighboring pass 180 on printing tray 12 to complete the layer (a single or double layer).

Referring now to FIG. 5A and to FIG. 5B, in some example embodiments of the invention, high throughput color printing is provided by concurrently printing a pair of layers 150. The pair of layers may optionally be printed over a plurality of travels 170 of printing block 50 to increase a printing resolution (DPI) that would otherwise be provided by nozzle array 122 and over a plurality of passes 180 (e.g. each print head has a Y printing resolution of 75 DPI; if a final Y printing resolution of 300 DPI is to be achieved, four consecutive travels is needed). For example, pair of layers 150 may be formed over four travels per pass. Optionally, pair of layers 150 may have a layer thickness of 55 μm. In other examples, when print head nozzle arrays are more densely packed (e.g. 300 DPI or 150 DPI), pair of layers 150 may be concurrently printed over a single travel per pass or over two travels per pass. In yet other examples, more than four travels per pass may be used to concurrently form pair of layers 150.

Referring now to FIG. 6A, according to some example embodiments of the invention, while concurrently printing a pair of layers 150, a droplet 152 from one of nozzle arrays 122 may be dispensed over or substantially near a droplet 151 from another nozzle array 122. Droplets 151 and 152 may be dispensed from any combination of two channels in printing block 50 based on the image data file provided to the 3D printer. Droplets 151 and 152 may fall one on the other (as shown) when nozzle arrays 122 of the jetting channels are aligned, and may optionally partially overlap or fall closely one next to the other when nozzle arrays 122 of the jetting channels are staggered. Over a first travel 170 of printing block 50, droplets 151a from a first channel and droplets 152a from a second channel may be dispensed. Over a second travel 170 of printing block 50, droplets 151b from the first channel and droplets 152b from the second channel may be dispensed. Over a third travel 170 of printing block 50, droplets 151c from the first channel and droplets 152c from the second channel may be dispensed. Over a fourth travel 170 of printing block 50, pass 180 may be completed with droplets 151d from the first channel and droplets 152d from the second channel being dispensed.

According to some example embodiments, leveling with leveling device 32 and curing with radiation source(s) 18 is performed per travel, per pass or after the pair of layers 150 is formed.

Referring now to FIG. 6B, in some example embodiments of the invention, high throughput color printing is provided by printing single layers 110 with less travels while maintaining the same number of DPI in the object being printed. Optionally, a single layer 110 may be printed in a high throughput color printing mode over two travels as compared to four travels that may be used in a standard color printing mode, thereby dividing the overall printing time by a factor of about 2. Depending on the alignment between nozzle arrays 122 in printing block 50, droplets 151 and 152 may be deposited one next to the other over a travel or may be staggered with spaces that maybe filled in a subsequent pass, or any combination thereof. Over a first travel 170 of printing block 50, droplets 151a from a first channel and droplets 152a from a second channel may be dispensed. Over a second travel 170 of printing block 50, pass 180 may be completed with droplets 151b being dispensed from the first channel and droplets 152b being dispensed from the second channel may be dispensed.

Figure 7:
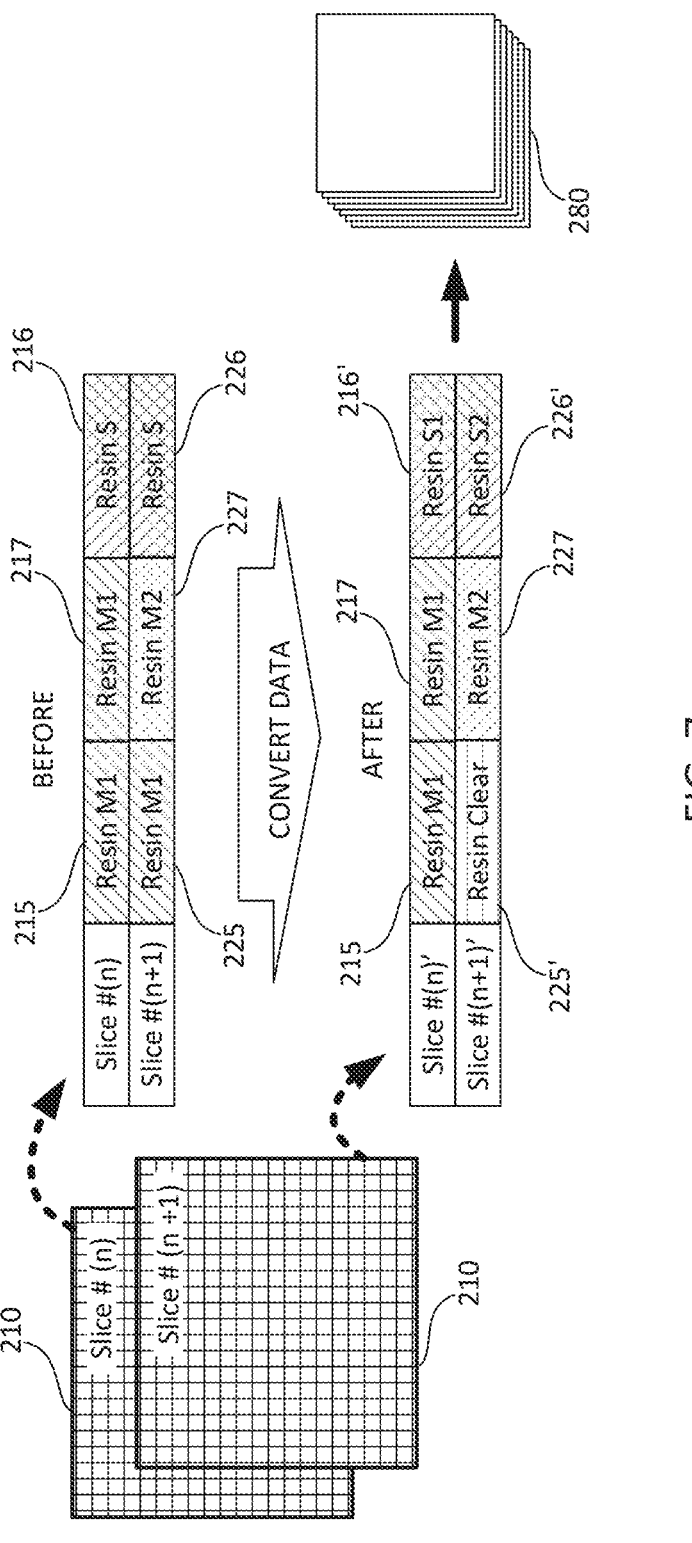
FIG. 7 is a schematic illustration of a color data conversion scheme for double layer high throughput color printing in accordance with some example embodiments.

Reference is now made to FIG. 7 showing a schematic illustration of a color data conversion scheme for double layer high throughput color printing in accordance with some example embodiments. According to some example embodiments, a computer model of an object to be printed may be sliced into slices 210 that are configured to be printed in pairs. For example, slices 210 include slice n and slice n+1 that are to be concurrently printed as a single layer in a high throughput printing mode. Each slice 210 may define a sub-layer having half a thickness of a printed layer. For example, each slice 210 may represent a thickness of 27 μm and the two slices (slice n and slice n+1) together form a printed layer with a thickness of 54 μm.

According to some example embodiments, pixel values in slice n and slice n+1 at similar (X, Y) locations may be compared to remove any overlap or inconsistencies between pixel values. For instance, if a pixel in slice n has a same value as a pixel in slice n+1 at a same (X, Y) location, an adaption or a conversion may be implemented. In the example shown in FIG. 7, a pixel 215 in slice n defines Resin M1 (modeling material #1) and a corresponding pixel 225 in slice n+1 also defines Resin M1. When a printing block only includes one channel of Resin M1 it may not be possible to dispense two droplets of Resin M1 at a same location over a same pass. Instead, one of the pixels, e.g. pixel 225 may be changed to a pixel 225' that defines an alternative resin, such as a clear or a support resin/ink. Based on this conversion, Resin M1 and alternative resin may be dispensed at a same location over a same pass. Also shown in the example of FIG. 7 is a pixel 216 in slice n that defines Resin S (support material) and a corresponding pixel 226 in slice n+1 also defines Resin S (support material). In some example embodiments, each of the pixels in this case may be adapted to indicate use of a different channel including Resin S. For example, pixel 216 may be converted to pixel 216' that more specifically indicates Resin S1 (support material from one channel) and pixel 226 may be converted to pixel 226' that more specifically indicates Resin S2 (support material from another channel). According to some example embodiments, the slices as defined without overlap are used to concurrently print slice n and slice n+1. In yet another example, a pixel 217 in slice n defines Resin M1 and a corresponding pixel 227 in slice n+1 defines Resin M2. Since, pixel 217 and pixel 227 define different resins, no conversion is needed. In a single layer printing methodology, the object may be sliced into thinner slices. For example, each slice 210 may represent a thickness of 13.5 μm and the two slices (slice n and slice n+1) together form a printed layer with a thickness of 27 μm. The pair of layers in the case may be concurrently printed so that one layer fills in the spaces that would otherwise have been left by the other layer. In some example embodiments, once the conversions are made, image data files 280 are generated with data separations for each printing head.

Figure 8A:
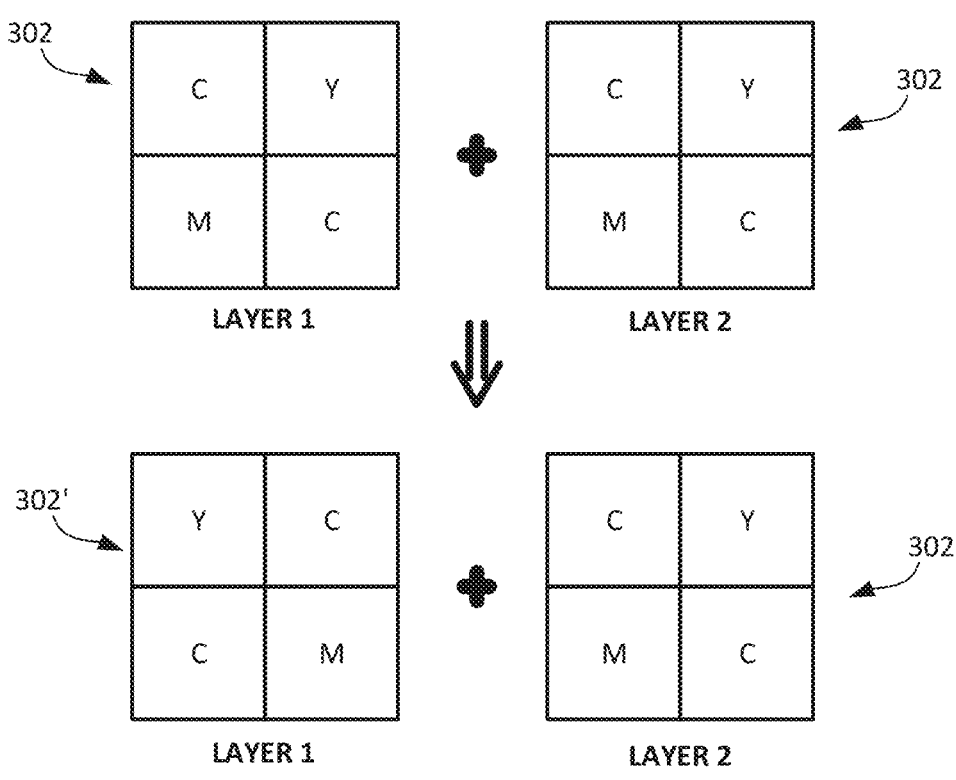
FIGS. 8A and 8B are schematic representations of example pattern conversion schemes for printing a digital mix of colors in accordance with some example embodiments.
Figure 8B:
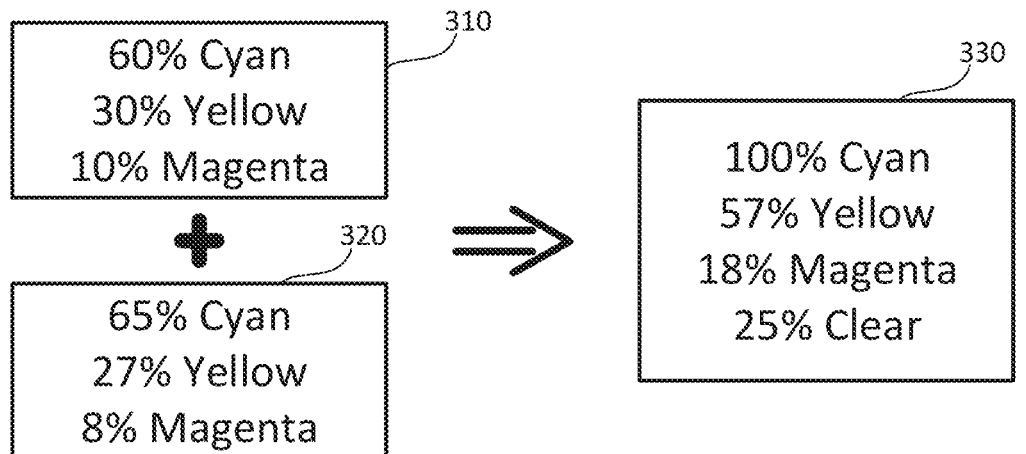

Reference is now made to FIGS. 8A and 8B showing simplified schematic representations of example pattern conversion schemes for printing a digital mix of colors in accordance with some example embodiments. In some example embodiments, one pixel in an image data file is represented by a plurality of droplets in the printed model. Optionally, the plurality of droplets form a digital mix of different colored modeling material. The pattern for printing the plurality of droplets representing a pixel may be selected to be random, pseudo-random or structured. According to some example embodiments, the pattern is adapted or defined to avoid overlap of identical modeling materials at a same location in the pair of concurrently printed layers.

In the example shown in FIG. 8A, each of two layers include a pixel that is a digital mix of two droplets of cyan, one droplet of yellow and one droplet of magenta at a same location. If the digital mix is formed with a same pattern 302 for each layer, there will be 100% overlap between the modeling material and 50% of the colored modeling materials would need to be replaced with clear modeling material to achieve concurrent printing of the two layers. Alternatively, pattern 302 in one of the layers, e.g. layer 1 may be replaced with a pattern 302'. Pattern 302 and 302' define the same color at the pixel level but do not include any overlap in modeling materials. In this manner, there would be no need to replace any of the colored modeling materials with clear modeling material and the color quality is not compromised.

In some example embodiments, when a pair of pixels is predominantly represented by one of the modeling materials, overlaps may not be entirely avoided based on adjusting the patterns. For example, if two pixels represent 200% coverage, overlap will occur for any one modeling material that exceeds 100% coverage. FIG. 8B is one such example of cyan exceeding 100% coverage. In FIG. 8B, pixel 310 in a first layer is defined with 60% probability of cyan, 30% probability of yellow and 10% probability of magenta and pixel 320 in a second layer is defined with 65% probability of cyan, 27% probability of yellow and 8% probability of magenta. Pixel 310 and pixel 320 are defined to be concurrently printed in a same location. When concurrently printing these two pixels, 125% out of 200% of the droplets are defined as cyan. However, it would only be possible to deposit 100% of the cyan droplets without overlap. According to some example embodiments, clear modeling material is used to replace any coverage above 100%. For example, clear material may be used for 25% coverage that would have otherwise been printed in cyan and the combined pixel 330 defining 200% coverage will instead be formed with 100% probability for cyan, 57% probability for yellow, 18% probability for magenta and 25% probability for clear. In this manner, the amount of clear material that is needed may be reduced or minimized and the color quality may be improved or maximized in high throughput color printing mode. Optionally, the distribution of the 25% clear material may be selected to improve the overall color quality of the object and minimize color dilution.

Reference is now made to FIG. 9 showing a simplified flow chart of an example method for high-throughput color printing. According to some example embodiments, when printing an object in high throughput color printing mode, a computer model of the object may be sliced into a plurality of layers that are configured to be printed in pairs (block 410). The concurrent printing of pairs of layers may provide faster color printing based on printing layers with double thickness or may provide printing each layer with fewer travels of the printing block.

According to some example embodiments, color data is added to each of the slices (block 420). The color data may optionally define digital materials. In some example embodiments, the color data for the pairs of layers that are to be concurrently printed may be compared (block 430) and adjustments may be made to provide their concurrent printing. Optionally, one or more of a pattern for forming a digital material and content of the digital material may be adjusted as discussed for example in reference to FIGS. 8A and 8B (block 440). According to some example embodiments, based on the adjustments the pairs of layers are concurrently printed (block 450). Optionally, the adjustments are defined to reduce or minimize the amount of clear material that is needed in place of colored modeling material.

Reference is now made to FIG. 10 showing a chart of example pairs of building materials that may be dispensed at a same target location over a single travel of a printing block in accordance with some example embodiments. According to some example embodiments, color data in each slice is defined with a pair of building materials that may be concurrently printed. The pair of building materials may be selected from a chart (list or table) as shown for example in FIG. 10. For example, each pixel in the slice may define one pair of building materials selected from pairs included in the chart shown in FIG. 10. In this manner, each slice provides instructions, e.g. data for double dispensing without any need to compare and adapt data from neighboring slices.

Figure 11:
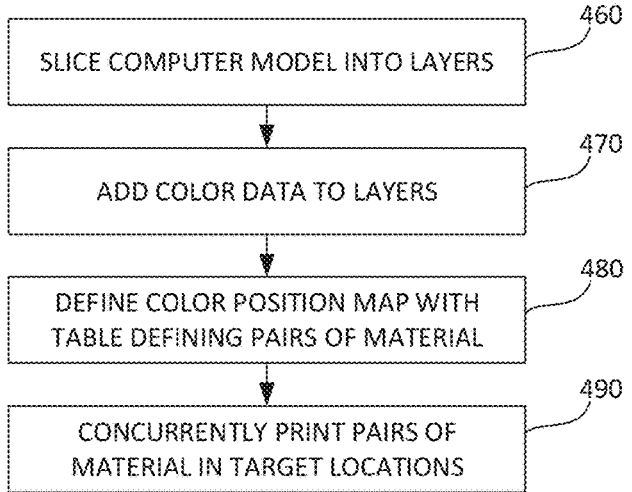
FIG. 11 is a simplified flow chart of another example method for high throughput color printing in accordance with some example embodiments.

Reference is now made to FIG. 11 showing a simplified flow chart of another example method for high throughput color printing in accordance with some example embodiments. According to some example embodiments, each slice of the 3D model defines a double dispensing scheme for high throughput printing. A 3D model may be sliced into layers with a desired thickness (block 460) and color data is added to each slice (block 470). According to some example embodiments, the added color data defines a pair of building materials per pixel, i.e. defines a color position map (block 480). The pair of building materials may be selected from a table of allowable pairings of building materials that are pre-defined and stored in memory. According to some example embodiments, the layer is printed with pairs of building materials being dispensed concurrently in a same target location (block 490).

Figure 12:
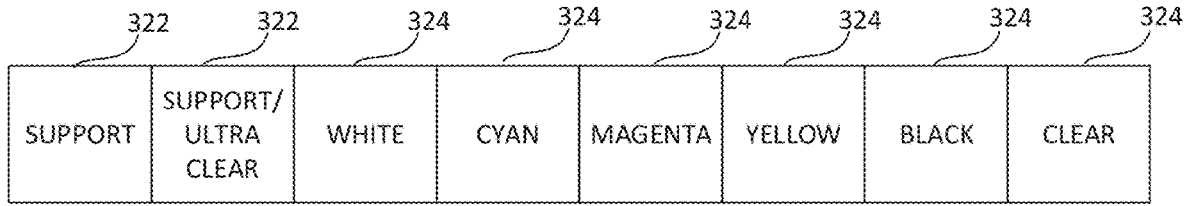
FIG. 12 is a simplified schematic drawing of another example set of building materials to be deposited by printing heads for high throughput color printing in accordance with some example embodiments.

Reference is now made to FIG. 12 showing a simplified schematic drawing of another example set of building materials to be deposited by printing heads for high throughput color printing in accordance with some example embodiments. According to some example embodiments, a 3D printer may be configured to switch between printing in a high throughput mode and a standard color printing mode. In some example embodiments, while printing in a high throughput mode, two channels 322 for dispensing building materials through inkjet printing head nozzle arrays are filled with support material and a plurality of additional channels 324 are filled with different colors or different types of modeling material. Optionally, two channels 322 including support material are neighboring channels feeding a same printing head. Optionally, support material provided to one channel 322 is 'flooded' so that the support material also fills the second channel 322. In other examples, two different printing heads may be configured to dispense support material. According to some example embodiments, switching to a high color definition mode is based on flushing out the support material from one of channels 322 and replacing that channel with a different modeling material. The additional modeling material may enhance an appearance of the object being printed. Optionally, a clear, i.e. transparent material, e.g. VeroClear™, VeroUltra™ Clear, may be added and used to provide printing a portion of the object that is configured to appear transparent.

Reference is now made to FIG. 13 showing a simplified flow chart of an example method to selectively switch between regular throughput color printing and high throughput color printing in accordance with some example embodiments. According to some example embodiments, a 3D printing system may detect a printing mode selection provided by a user (block 505). In some example embodiments, the 3D printing system may be similar in construction for example to 3D printing system 10 (FIG. 1A) or 3D printing system 10' (FIG. 1B) with modifications configured to provide printing in the two different printing modes. The user selection may be provided with a mechanical switch or button included in the system or may be based on virtual button selection with user interface device 116. According to some example embodiments, when a high throughput color printing mode is selected, a computer, e.g. data processor 24 (FIG. 1A) of the 3D printing system is configured to slice a 3D model of object(s) 200 and define or adjust the color data for the slices so that it is configured for double channel dispensing as described herein (block 512). Optionally, the adjustment includes integrating some clear modeling material in the object(s) with colored modeling material to increase the volume of building material that can be printed per travel, i.e., to enable double channel dispensing. If support material is needed to build the object(s), the 3D printer may also be adapted for high throughput printing with support material. Adaption of the 3D printer may include flushing out a modeling material provided by one of the channels (block 515) and in its place loading support material (block 520) so that the 3D printer includes two channels that can dispense support material. Optionally, a channel including clear modeling material is flushed out. Based on these adjustments, a high throughput printing mode may be initiated (block 525). Optionally, when no support material is needed for building the object, the method of blocks 515 and block 520 may be skipped.

According to some example embodiments, a standard 3D color printing mode may be selected instead. When a standard 3D color printing mode is selected, the 3D system, e.g. data processor 24 slices the 3D model of object(s) 200 and defines the color data for standard 3D color printing, e.g. single dispensing at a target location per travel (block 513).

Optionally, if the printing block includes two channels of support material, support material from one of the channels is flushed out (block 516) and in place another modeling material, e.g. clear modeling material may be loaded (block 520). Based on these adjustments, a high color definition printing mode may be initiated (block 525).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental and calculated support in the following examples.

EXAMPLES

Reference is now made to the following examples, which together with the above descriptions illustrate some embodiments of the invention in a non-limiting fashion.

In one example, printing times for printing a same object in three different modes were compared. The first and second mode were high throughput 3D color printing modes as described herein. In the first mode, 55 μm layers were printed with 4 passes of the 3D printer per layer. In the second example mode, 27 μm layers were printed with 2 passes of the 3D printer per layer. The third mode was a standard 3D color printing mode as in known in the art.

TABLE 1

| Comparison of Printing Times | | |
| --- | --- | --- |
| Printing Mode | Printing Parameters | Printing time (hours) |
| High throughput Printing mode 1 | 55 μm layers; 4 pass/layer | 4:39 |
| High throughput Printing mode 2 | 27 μm layers; 2 pass/layer | 4:52 |
| Reference Printing mode | 27 μm layers; 4 pass/layer | 8:05 |

Table 1 clearly shows that the high throughput 3D printing mode is successful in significantly decreasing the time it takes to print an object. For both the first printing mode and the second printing mode, the printing time was almost half of the printing time needed for the reference printing mode.

In another example, the color quality of an object printed in a high throughput mode as described herein was compared to a color quality of the same object printed in a standard color printing mode, e.g. printing mode 3 as described in Table 1.

Reference is now made to FIG. 14A showing an image of an example object printed with standard throughput color printing (reference printing mode) and to FIG. 14B showing a same example object printed in a high throughput color printing mode in accordance with some example embodiments. Both FIG. 14A and FIG. 14B show good color definition. Some of the colors in object shown in FIG. 14A do appear to be sharper as compared to FIG. 14B. However, the benefit in the substantial decrease in printing time may outweigh the benefit of color quality in some applications and for some objects. The color quality achieved may also depend on the object that is being printed.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for 3D color printing of an object, the method comprising:

slicing a 3D model of the object;

adding color data to slices of said 3D model; and printing said slices with a printing block including a plurality of channels, said plurality of channels including channels each with a different colored building material and a channel with a clear building material, wherein said printing includes dispensing at each target location of a travel of said printing block, two at least partially overlapping droplets of building materials from respective two channels of said plurality of channels, said two channels per target location being selected based on said color data, wherein said two at least partially overlapping droplets are selected based on a pair of said slices.

2. The method of claim 1, wherein said printing includes dispensing both clear building material and one of said colored building material at a first target location of said travel based on said color data indicating said one of said color in said first target location.

3. The method of claim 1, wherein said printing includes dispensing two different colored building materials at a second target location of said travel based on said color data indicating a digital mix that includes said two different colored building materials in said second target location.

4. The method of claim 1, wherein said printing block additionally includes two channels with support material and wherein said printing includes dispensing said support material from each said two channels of support material at a third target location of said travel.

5. The method of claim 4, wherein said printing includes dispensing both said support material from one of said two channels and one of said colored building material at a fourth target location of said travel.

6. The method of claim 1, comprising adjusting said color data to accommodate dispensing at each target location of said travel of said printing block, said building material from two channels of said plurality of channels.

7. The method of claim 6, wherein said adjusting includes replacing at least one pixel of said color data defining one of said colored modeling materials with a pixel defining clear modeling material.

8. The method of claim 1, wherein a value of each pixel of said color data is configured to indicate printing with a defined pair of channels from said plurality of channels.

9. The method of claim 1, wherein dispensing at each target location of a travel of said printing block from said two channels includes dispensing, per target location, a droplet from one channel selected based on said color data of one slice of said pair and dispensing a droplet from another channel selected based on said color data of the other slice of said pair.

10. The method of claim 1, comprising adapting said color data in said pair to eliminate redundancies of colors in corresponding pixels of said pair.

11. The method of claim 1, wherein said channels with different colored building materials includes cyan, yellow, magenta, white and black modeling material.

12. The method of claim 11, wherein said white modeling material includes a higher pigment concentration as compared to at least one other colored modeling material to compensate for color dilution when adding clear modeling material to target locations defined to include white modeling material.

13. The method of claim 1, comprising switching between dispensing at each target location of a travel building material from two channels of said plurality of channels to dispensing at each target location of a travel building material from one channel of said plurality of channels.

14. A method for 3D color printing of an object, the method comprising:

slicing a 3D model of the object;

adding color data to slices of said 3D model; and printing said slices with a printing block including a plurality of channels, said plurality of channels including channels each with a different colored building material and a channel with a clear building material, wherein said printing includes dispensing at each target location of a travel of said printing block, two at least partially overlapping droplets of building materials from respective two channels of said plurality of channels, said two channels per target location being selected based on said color data, wherein at least one of said slices is defined over a plurality of pixels, wherein at least one of said pixels defines a pair of colors, and wherein said two at least partially overlapping droplets of building material are selected based on said pair of colors of a respective pixel.

15. The method of claim 14, wherein said printing includes dispensing both clear building material and one of said colored building material at a first target location of said travel based on said color data indicating said one of said color in said first target location.

16. The method of claim 14, wherein said printing includes dispensing two different colored building materials at a second target location of said travel based on said color data indicating a digital mix that includes said two different colored building materials in said second target location.

17. The method of claim 14, wherein said printing block additionally includes two channels with support material and wherein said printing includes dispensing said support material from each said two channels of support material at a third target location of said travel.

18. The method of claim 14, comprising adjusting said color data to accommodate dispensing at each target location of said travel of said printing block, said building material from two channels of said plurality of channels.

19. A method for 3D color printing of an object, the method comprising:

slicing a 3D model of the object;

adding color data to slices of said 3D model; and printing said slices with a printing block including a plurality of channels, said plurality of channels including channels each with a different colored building material a channel with a clear building material, and two channels with support material;

wherein said printing includes:

dispensing at each target location of a travel of said printing block, two at least partially overlapping droplets of building materials from respective two channels of said plurality of channels, said two channels per target location being selected based on said color data, dispensing said support material from each of said two channels of support material at a third target location of said travel, and dispensing both said support material from one of said two channels and one of said colored building material at a fourth target location of said travel.

20. A method for 3D color printing of an object, the method comprising:

slicing a 3D model of the object;

adding color data to slices of said 3D model; and printing said slices with a printing block including a plurality of channels, said plurality of channels including channels each with a different colored building material and a channel with a clear building material, wherein said printing includes dispensing at each target location of a travel of said printing block, two at least partially overlapping droplets of building materials from respective two channels of said plurality of channels, said two channels per target location being selected based on said color data;

wherein said channels with different colored building materials includes cyan, yellow, magenta, white and black modeling material, and wherein said white modeling material includes a higher pigment concentration as compared to at least one other colored modeling material to compensate for color dilution when adding clear modeling material to target locations defined to include white modeling material.

* * * * *